(12) United States Patent
Matsuura

(10) Patent No.: US 11,964,496 B2
(45) Date of Patent: Apr. 23, 2024

(54) OPTICAL WRITING APPARATUS, IMAGE FORMING APPARATUS, AND CONTROL METHOD

(71) Applicant: Yuugo Matsuura, Kanagawa (JP)

(72) Inventor: Yuugo Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 17/685,564

(22) Filed: Mar. 3, 2022

(65) Prior Publication Data

US 2022/0317440 A1 Oct. 6, 2022

(30) Foreign Application Priority Data

Mar. 30, 2021 (JP) ................................ 2021-056715

(51) Int. Cl.
*B41J 2/47* (2006.01)
*G02B 26/12* (2006.01)
*G03G 15/041* (2006.01)
*B41J 2/435* (2006.01)
*H04N 1/113* (2006.01)
*H04N 1/393* (2006.01)

(52) U.S. Cl.
CPC .................. *B41J 2/471* (2013.01); *B41J 2/47* (2013.01); *G02B 26/124* (2013.01); *G03G 15/0415* (2013.01); *B41J 2/435* (2013.01); *H04N 1/1135* (2013.01); *H04N 1/393* (2013.01)

(58) Field of Classification Search
CPC ... B41J 2/471; B41J 2/47; B41J 2/435; G02B 26/124; G03G 15/0415; H04N 1/1135; H04N 1/393
See application file for complete search history.

(56) References Cited

U.S. PATENT DOCUMENTS

2002/0135669 A1* 9/2002 Ueno ...................... H04N 1/053
 347/250
2005/0206718 A1* 9/2005 Komiya .................. B41J 2/471
 347/246

FOREIGN PATENT DOCUMENTS

JP 2005-059602 3/2005

* cited by examiner

*Primary Examiner* — Henok D Legesse
(74) *Attorney, Agent, or Firm* — Duft & Bornsen, PC

(57) ABSTRACT

An optical writing device, and a method of controlling the optical writing device. The optical writing device and the method includes controlling speed of operation of a light deflector based on image magnifying-power information in a sub-scanning direction parallel to a direction in which a surface of a photoconductor moves, and controlling a prescribed write clock frequency such that a number of clock pulses of write light will become a target number of pulses over a period where the write light scans an area within a prescribed distance in a main scanning direction, the target number of pulses being maintained even when the speed of operation of the light deflector is changed in the controlling the speed of operation of the light deflector. The write clock frequency controller maintains the target number of pulses even when the speed of operation of the light deflector is changed by the light-deflector controller.

9 Claims, 11 Drawing Sheets

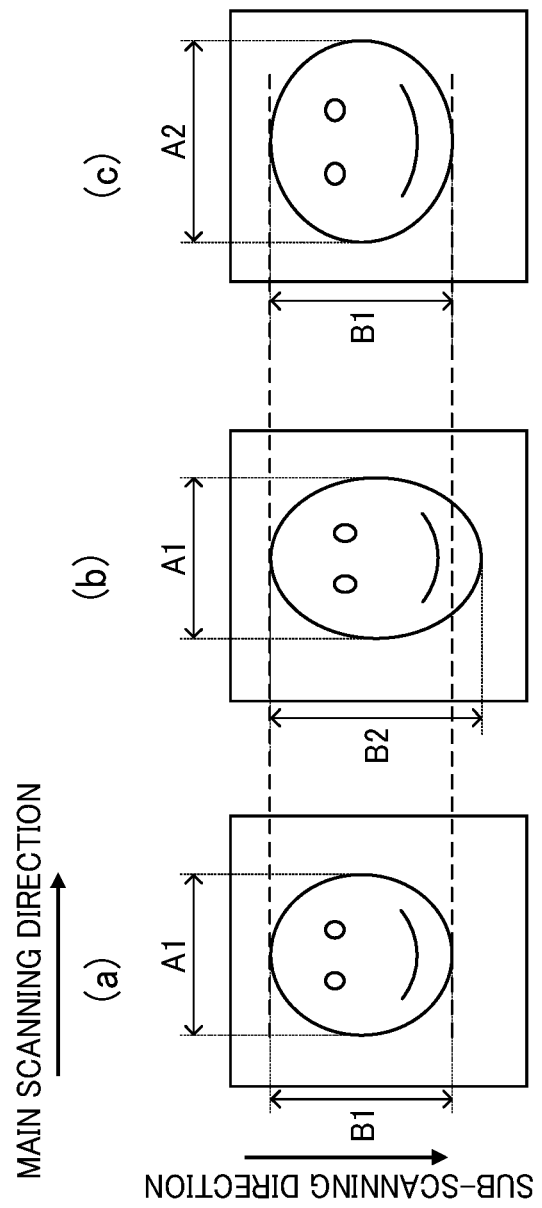

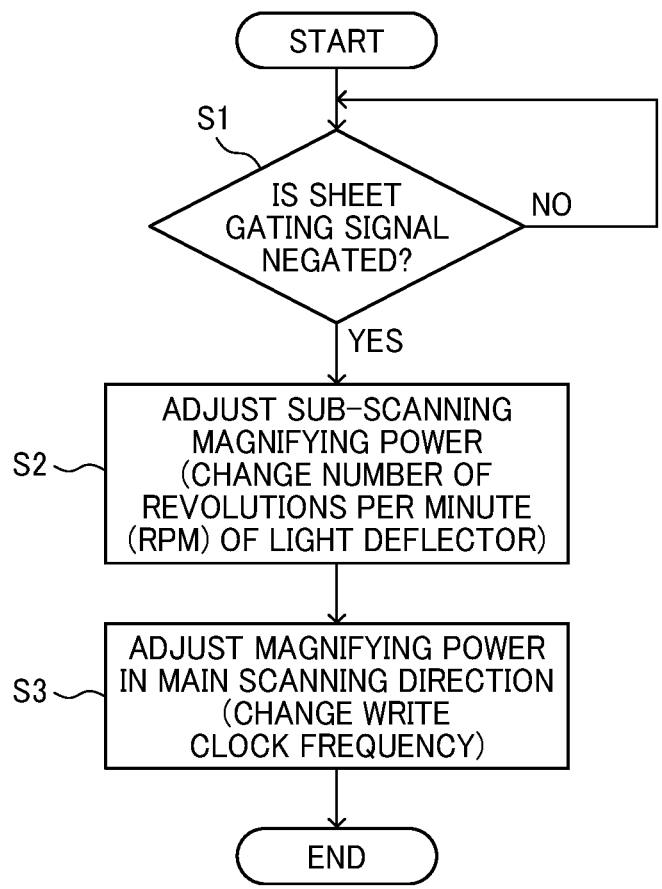

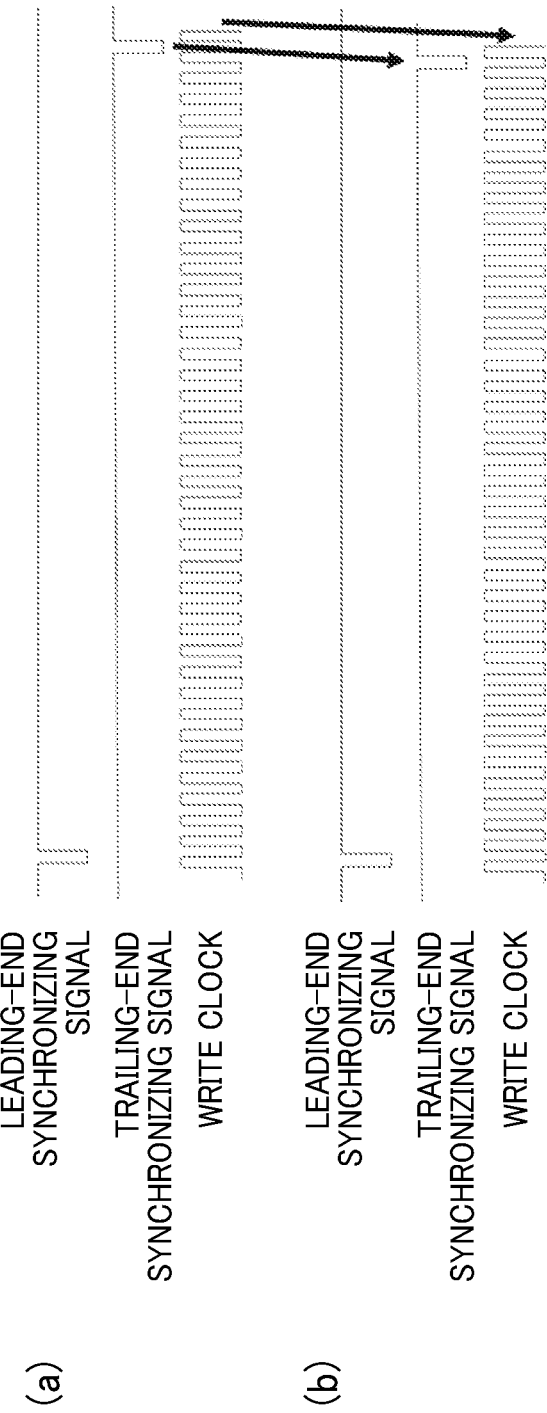

OPTICAL WRITING APPARATUS, IMAGE FORMING APPARATUS, AND CONTROL METHOD

CROSS-REFERENCE TO RELATED APPLICATION

This patent application is based on and claims priority pursuant to 35 U.S.C. § 119(a) to Japanese Patent Application No. 2021-056715, filed on Mar. 30, 2021, in the Japan Patent Office, the entire disclosure of which is hereby incorporated by reference herein.

BACKGROUND

Technical Field

Embodiments of the present disclosure relate to an optical writing device, an image forming apparatus, and a control method.

Background Art

In the related art, optical writing devices have been proposed that include a light source to emit light at a prescribed write clock frequency, the light emitted from the light source indicating image data, and a light deflector to deflect write light including repetition pulsed light corresponding to the image data. In such optical writing devices, the moving surface of a photoconductor is scanned repeatedly in a main scanning direction, and a latent image is written on the surface of the photoconductor based on the image data.

For example, optical writing devices are proposed that include a writing-operation controller such as a light-deflector controller. Such a writing-operation controller controls the speed of operation, i.e., the number of revolutions per minute (rpm) of a polygon mirror that serves as a light deflector in order to perform fine adjustments on the magnifying power for an image in the sub-scanning direction parallel to a direction in which the surface of the photoconductor moves. In such optical writing devices, the writing-operation controller also controls the write clock frequency to cancel the changes in the magnifying power for the image in the main scanning direction that are caused by the above fine adjustments. More specifically, the writing-operation controller refers to a magnifying power correction table in which the relation between a plurality of values used to adjust the magnifying power in the sub-scanning direction and a plurality of values used to adjust the magnifying power in the main scanning direction is described. The multiple values used to adjust the magnifying power in the main scanning direction are used to cancel the changes in the magnifying power for the image in the main scanning direction according to the multiple values used to adjust the magnifying power in the sub-scanning direction. Moreover, the writing-operation controller controls the number of revolutions per minute of the polygon mirror according to the sub-scanning direction magnification adjustment value, and controls the write clock frequency according to the corresponding main scanning direction magnification adjustment value.

SUMMARY

Embodiments of the present disclosure described herein provide an optical writing device, and a method of controlling the optical writing device. The optical writing device includes a light source to emit light at a prescribed write clock frequency, the light emitted from the light source indicating image data, a light deflector to deflect write light including repetition pulsed light corresponding to the image data to scan a moving surface of a photoconductor repeatedly in a main scanning direction, and to write a latent image on the surface of the photoconductor based on the image data, a light-deflector controller to control speed of operation of the light deflector based on image magnifying-power information in a sub-scanning direction parallel to a direction in which the surface of the photoconductor moves, a write clock frequency controller to control the prescribed write clock frequency such that a number of clock pulses of the write light will become a target number of pulses over a period where the write light scans an area within a prescribed distance in the main scanning direction. The write clock frequency controller maintains the target number of pulses even when the speed of operation of the light deflector is changed by the light-deflector controller. The method includes controlling speed of operation of a light deflector based on image magnifying-power information in a sub-scanning direction parallel to a direction in which a surface of a photoconductor moves, and controlling a prescribed write clock frequency such that a number of clock pulses of write light will become a target number of pulses over a period where the write light scans an area within a prescribed distance in a main scanning direction, the target number of pulses being maintained even when the speed of operation of the light deflector is changed in the controlling the speed of operation of the light deflector.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 5 includes sub-diagrams (a), (b), and (c), where the sub-diagram (a) illustrates an original image to be formed, according to an embodiment of the present disclosure, the sub-diagram (b) is an enlarged view of the image of the sub-diagram (a) in the sub-scanning direction, and the sub-diagram (c) illustrates a state in which the elongation of the image in the sub-scanning direction as illustrated in FIG. 5B is cancelled and the image is enlarged in the main scanning direction in conjunction with the cancellation.

FIG. 7 is a schematic flowchart of the controlling processes performed by a writing controller according to a control sample of the above embodiment of the present disclosure.

FIG. 12 includes a sub-diagram (a) of FIG. 12 and a sub-diagram (b) of FIG. 12, where the sub-diagram (a) of FIG. 12 illustrates the relation between a leading-end synchronizing signal, a trailing-end synchronizing signal, and a write clock when an image is enlarged in the main scanning direction, according to the alternative embodiment of FIG. 11, and the sub-diagram (b) of FIG. 12 illustrates the relation between a leading-end synchronizing signal, a trailing-end synchronizing signal, and a write clock when the magnifying power in the main scanning direction is adjusted on the image referred to in the sub-diagram (a) of FIG. 12.

Figure 1:
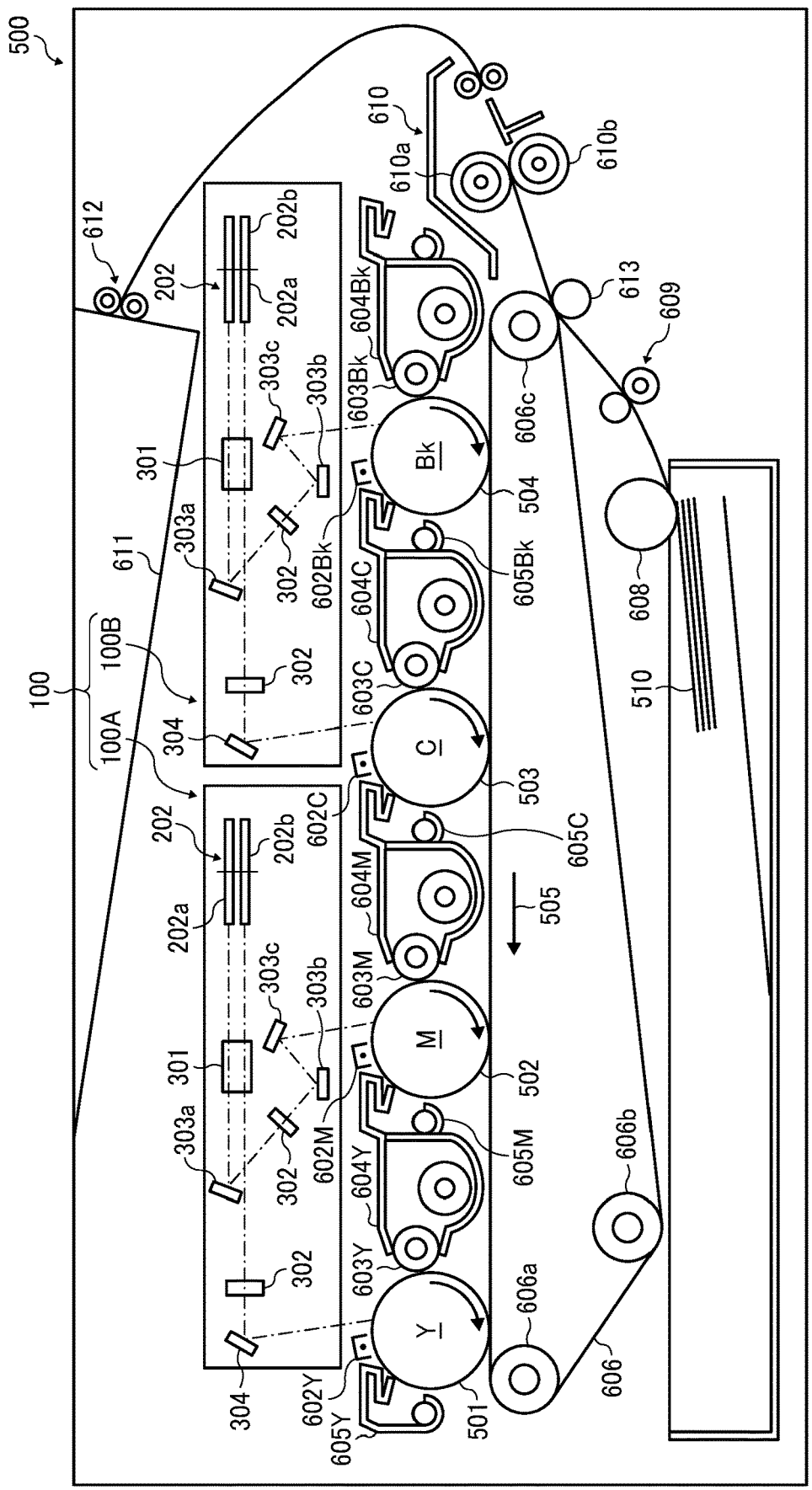
FIG. 1 is a schematic diagram of a configuration or structure of a color printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An optical writing device according to an embodiment of the present disclosure that serves as an optical scanner and is applied to a color printer that serves as an image forming apparatus is described below with reference to the accompanying drawings.

FIG. 1 is a schematic diagram of a configuration or structure of a color printer according to an embodiment of the present disclosure.

The color printer 500 according to the present embodiment is a tandem-type multicolor printer that can form a full-color toner image by superimposing multiple images of four colors (black, cyan, magenta, and yellow) on top of one another. The color printer 500 is provided with an optical writing device 100 and four photoconductor drums 501, 502, 503, and 504. The color printer 500 is provided with four cleaning units 605Y, 605M, 605C, and 605BK, and four charging devices 602Y, 602M, 602C, 602BK. The color printer 500 is provided with four developing devices 604Y, 604M, 604C, and 604BK including developing rollers 603Y, 603M, 603C, and 603BK. Further, the color printer 500 is provided with, for example, an intermediate transfer belt 606 that serves as an intermediate transferor, a secondary transfer roller 613, a fixing device 610, a feed roller 608, a registration roller pair 609, an output roller pair 612, and an output tray 611.

The photoconductor drum 501, the cleaning unit 605Y, the charging device 602Y, the developing roller 603Y, and the developing device 604Y are used as a unit, and together configure an image station that forms a yellow (Y) image. In the following description, such an image station that forms a yellow (Y) image may be referred to as a Y station. The photoconductor drum 502, the cleaning unit 605M, the charging device 602M, the developing roller 603M, and the developing device 604M are used as a unit, and together configure an image station that forms a magenta (M) image. In the following description, such an image station that forms a magenta (M) image may be referred to as an M station. The photoconductor drum 503, the cleaning unit 605C, the charging device 602C, the developing roller 603C, and the developing device 604C are used as a unit, and together configure an image station that forms a cyan (C) image. In the following description, such an image station that forms a cyan (C) image may be referred to as a C station. The photoconductor drum 504, the cleaning unit 605BK, the charging device 602BK, the developing roller 603BK, and the developing device 604BK are used as a unit, and together configure an image station that forms a black (BK)

image. In the following description, such an image station that forms a black (BK) image may be referred to as a BK station.

Each one of the photoconductor drums 501, 502, 503, and 504 has a photosensitive layer on its peripheral surface, and is driven by a rotating mechanism to rotate in the direction indicated by the arrow in FIG. 1. Each of the charging devices 602Y, 602M, 602C, and 602BK evenly charges the surface of the associated one of the photoconductor drums 501, 502, 503, and 504, respectively.

The optical writing device 100 includes an M-Y unit 100A used to expose and scan the photoconductor drum 501 for yellow (Y) and the photoconductor drum 502 for magenta (M), and a BK-C unit 100B used to expose and scan the photoconductor drum 503 for cyan (C) and the photoconductor drum 504 for black (BK). The optical writing device 100 irradiates each one of the photoconductor drums 501, 502, 503, and 504 with write light or scanning light under controlling the turning on and off of lighting based on the image data to form an electrostatic latent image on the surface of the corresponding one of the photoconductor drums that serves as a to-be-scanned surface. The electrostatic latent images formed as above are conveyed to developing regions facing developing rollers of the developing devices 604Y, 604M, 604C, and 604BK along with rotation of the photoconductor drums 501, 502, 503, and 504.

Each one of the developing devices 604Y, 604M, 604C, and 604BK is provided with a developing roller that bears charged toner. A predetermined developing bias is applied to the developing roller, and the toner on the developing roller adheres to the electrostatic latent image on the photoconductor drum due to the effect of a developing electric field formed by the applied developing bias. As a result, a toner image of adhered toner is formed on each one of the photoconductor drums 501, 502, 503, and 504.

The toner image formed as above is conveyed to a primary transferring area that faces the intermediate transfer belt 606 as the photoconductor drums 501, 502, 503, and 504 rotate. The toner images of yellow, magenta, cyan, and black on the photoconductor drums 501, 502, 503, and 504 are sequentially primary-transferred onto the intermediate transfer belt 606 at timings where the toner images overlap each other as desired. As a result, a multicolor image is formed onto the intermediate transfer belt 606. Each of the cleaning units 605Y, 605M, 605C, and 605BK removes the transfer residual toner that is not transferred and remains on the surface of the corresponding one of the photoconductor drums 501, 502, 503, and 504.

On the other hand, a recording sheet 510 that serves as a recording material is conveyed to a registration roller pair 609 by a feed roller 608 on a one-by-one basis. The registration roller pair 609 sends the recording sheet 510 to a secondary transferring area where the intermediate transfer belt 606 and the secondary transfer roller 613 face each other at a prescribed timing. In the secondary transferring area, the multicolor toner image on the intermediate transfer belt 606 is secondarily transferred to the recording sheet 510. The recording sheet 510 onto which the multicolor toner image has been transferred is then sent to the fixing device 610. The fixing device 610 fixes the toner image on the recording sheet 510 by heat and pressure. The recording sheet 510 onto which an image has been fixed is ejected to the output tray 611 through the output roller pair 612.

The configuration and operation of the optical writing device 100 is described below.

The M-Y unit 100A and the BK-C unit 100B that are elements of the optical writing device 100 have the equivalent basic configuration. Accordingly, the configuration and operation of the optical writing device 100 is described with reference to the BK-C unit 100B in the following description. In the following description, color codes Y, M, C, and BK that denote yellow, magenta, cyan, and black, respectively, are omitted as appropriate.

Figure 2:
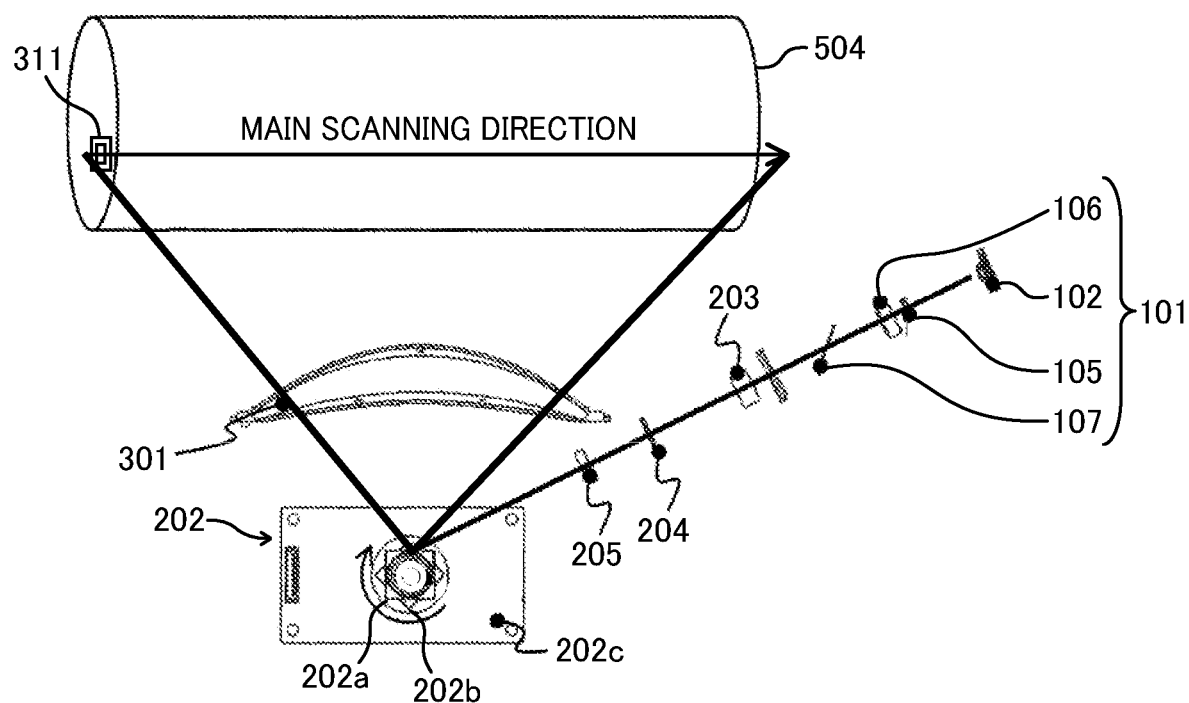
FIG. 2 is a schematic view of the layout of an incident optical system of a BK-C unit in the color printer of FIG. 1.

FIG. 2 is a diagram illustrating the layout of an incident optical system of the BK-C unit 100B, according to the present embodiment.

A light source unit 101 according to the present embodiment includes a light source 102 provided with, for example, a surface-emitting laser that emits linearly-polarized laser beam, and a quarter-wave plate 105 that converts the laser beam emitted from the light source 102 into circularly polarized light. Moreover, the light source unit 101 according to the present embodiment includes a collimator lens 106 that collimates the laser beam converted into the circularly polarized light by the quarter-wave plate 105, and an aperture 107 that cuts off the laser beam collimated by the collimator lens 106. The relative positions of these optical components including the light source 102, the quarter-wave plate 105, the collimator lens 106, and the aperture 107 with respect to a light-source holder are determined at predetermined positions, and are integrally assembled. The laser beam that is emitted from the light source unit 101 passes through an incident optical system, and is incident on a light deflector 202 that serves as an optical scanner.

The incident optical system is provided with a polarizing beam splitter (PBS) 203 that splits the laser beam emitted from the light source unit 101 into two laser beams in the sub-scanning direction. The sub-scanning direction according to the present embodiment is parallel to the up-and-down directions of the drawing of FIG. 2. Moreover, the incident optical system is provided with a quarter-wave plate 204 that converts the polarization characteristics of the laser beams L1 and L2, which are obtained by the division performed by the polarizing beam splitter 203, from linearly polarized light to circularly polarized light. Moreover, the incident optical system is provided with a cylindrical lens 205 that forms couple of images of the laser beams L1 and L2 converted into circularly polarized light on the mirror surfaces of two rotating polygon mirrors 202a and 202b provided for the light deflector 202. The cylindrical lens 205 has a function to concentrate the converted and circularly polarized laser beam only in the sub-scanning direction.

The image to be formed by the laser beams L1 and L2 that are formed into a predetermined laser profile by such an incident optical system are formed on the mirror surfaces of the multiple polygon mirrors 202a and 202b of the light deflector 202. The light deflector 202 integrally drives the polygon mirrors 202a and 202b in a stable manner at a predetermined number of revolutions per minute (rpm) around a rotation axis parallel to the sub-scanning direction. Such a number of revolutions per minute indicates the speed of operation. When the laser beams L1 and L2 are incident on the mirror surfaces of the rotating polygon mirrors 202a and 202b rotating in this manner, the laser beams L1 and L2 are scanned in the main scanning direction as illustrated in FIG. 2.

In the present embodiment, a leading-end synchronization sensor 311 is arranged upstream from each one of the photoconductor drums 501, 502, 503, and 504 in the main scanning direction. Once the leading-end synchronization sensor 311 detects the laser beams L1 and L2, a leading-end synchronizing signal is output from the leading-end synchronization sensor 311. A writing controller as will be described later in detail refers to the timing at which a leading-end synchronizing signal is output, and starts controlling the turning on and off of lighting based on image data. By so doing, the writing controller synchronizes the timing at which the writing operations in the main scanning direction starts.

Figure 3:
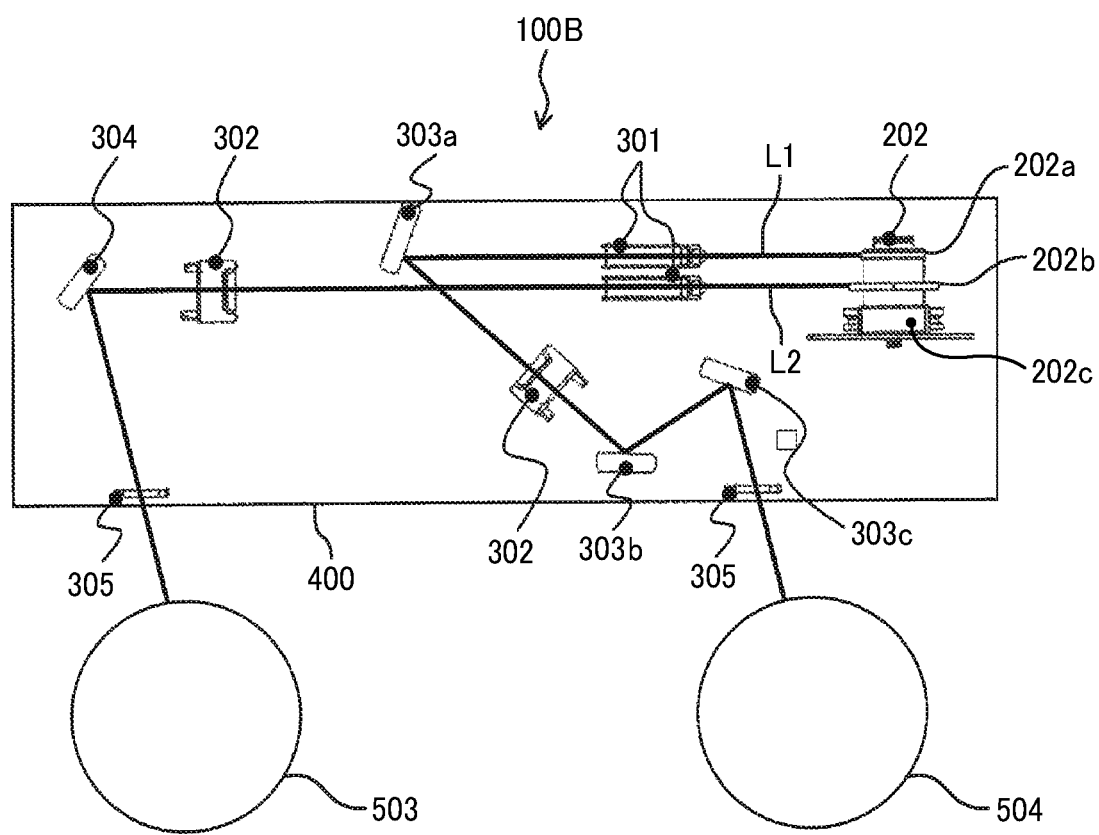
FIG. 3 is a schematic view of the layout of a scanning optical system of the BK-C unit of FIG. 1.

FIG. 3 is a diagram illustrating the layout of a scanning optical system of the BK-C unit 100B, according to the present embodiment.

The laser beam L1 that is one of the multiple laser beams scanned by the light deflector 202, which is the laser beams that are scanned on the mirror surface of an upper polygon mirror 202a, passes through a scanning lens 301 and a long lens 302, and then passes through a dustproofing glass 305. Then, the laser beam L1 that is one of the multiple laser beams scanned by the light deflector 202 is equal-speed scanned on the surface of the photoconductor drum 504. On the above optical path, mirrors 303a, 303b, and 303c for reflecting and turning the laser beam L1 are arranged. The laser beam L2 that is another of the multiple laser beams scanned by the light deflector 202, which is the laser beams that are scanned on the mirror surfaces of a lower polygon mirror 202b, passes through the scanning lens 301 and the long lens 302, and then passes through the dustproofing glass 305. Then, the laser beam L2 that is another one of the multiple laser beams scanned by the light deflector 202 is equal-speed scanned on the surface of the photoconductor drum 503. A mirror 304 for reflecting and turning the laser beam L2 is arranged on the optical path.

All of the incident optical system, the light deflector 202, and the scanning optical system as described above are integrally arranged in an optical housing 400 as illustrated in FIG. 3, which serves as a holding member.

A method of adjusting the magnifying power in the sub-scanning direction of an image is described below.

Figure 4:
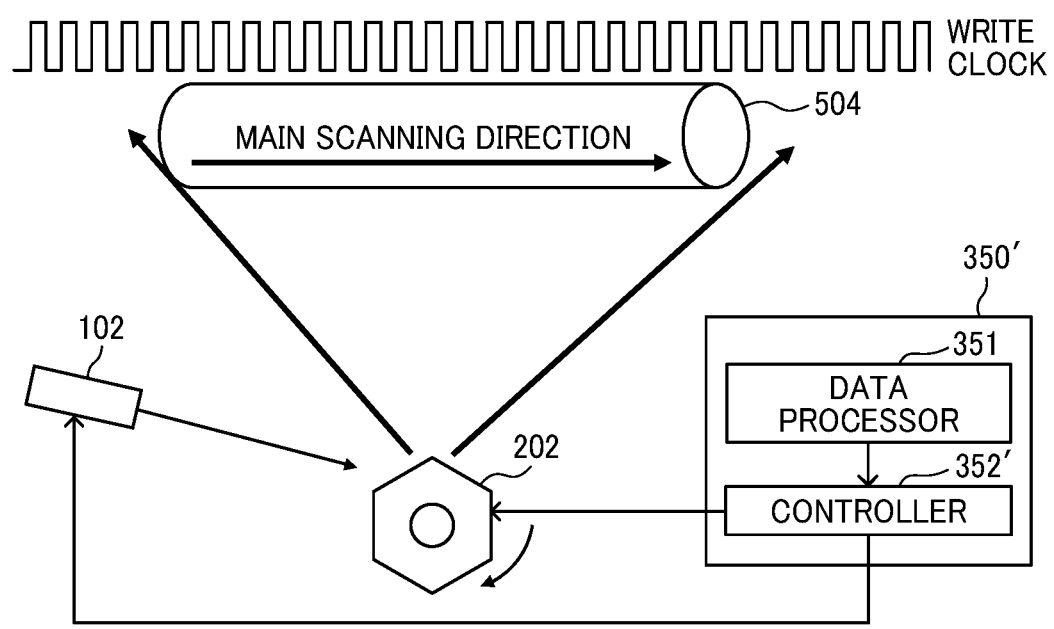
FIG. 4 is a diagram illustrating a configuration of a writing controller according to a control sample of the above embodiment of the present disclosure.

FIG. 4 is a diagram illustrating a configuration of a writing controller 350' according to a control sample of the above embodiment of the present disclosure.

Sub-diagram (a) of FIG. 5 illustrates an original image to be formed, according to a control sample of the above embodiment of the present disclosure.

Sub-diagram (b) of FIG. 5 is an enlarged view of the image of the sub-diagram (a) of FIG. 5 in the sub-scanning direction, according to a control sample of the above embodiment of the present disclosure.

Sub-diagram (c) of FIG. 5 illustrates a state in which the elongation of the image in the sub-scanning direction as illustrated in FIG. 5B is cancelled and the image is enlarged in the main scanning direction in conjunction with the cancellation.

When the magnifying power in the sub-scanning direction of an image is adjusted, data processing may be performed on the image data used to generate write light, to adjust the magnifying power in the sub-scanning direction. However, when the magnifying power in the sub-scanning direction is changed significantly, the capacity of a memory that stores the image data may increase, and the processing load on the data processing unit 351 such as an application-specific integrated circuit (ASIC) that performs data processing also increases. Accordingly, the cost of the writing controller 350' may also increase.

In order to handle such a situation, a data processing unit 351 that is inexpensive and does not have a function to adjust the magnifying power in the sub-scanning direction by data processing is employed for the writing controller 350', and the number of revolutions per minute of the light deflector 202 is adjusted to adjust the magnifying power in the sub-scanning direction. For example, when the magnifying power in the sub-scanning direction is to be decreased, the number of revolutions per minute of the light deflector 202 is increased to narrow the interval between the scanning lines of the write light on the photoconductor drum 504. For example, when the magnifying power in the sub-scanning direction is to be increased, the number of revolutions per minute of the light deflector 202 is decreased to widen the interval between the scanning lines of the write light on the photoconductor drum 504. The adjustment of the magnifying power in the sub-scanning direction by the data processing unit 351 and the adjustment of the magnifying power in the sub-scanning direction by the adjustment of the number of revolutions per minute of the light deflector 202 may be used in combination.

For example, when the image is enlarged in the sub-scanning direction as illustrated in the sub-diagram (b) of FIG. 5 based on the image data of the image as illustrated in the sub-diagram (a) of FIG. 5, the number of revolutions per minute of the light deflector 202 is increased in order to reduce the magnifying power in the sub-scanning direction.

$$B2 > B1$$

In such cases, the interval between the scanning lines of the write light on the photoconductor drum 504 is narrowed. Accordingly, the magnifying power in the sub-scanning direction decreases. As a result, as illustrated in the sub-diagram (c) of FIG. 5, the elongation of the image in the sub-scanning direction can be cancelled.

In the present embodiment, when the magnifying power in the sub-scanning direction is adjusted by adjusting the number of revolutions per minute of the light deflector 202, the scanning speed in the main scanning direction is also changed. In such cases, as illustrated in FIG. 4, the interval of one dot of the electrostatic latent image that is written for each clock pulse of the write light, which is the repetition pulsed light, changes. As a result, the magnifying power of the image in the main scanning direction is unintentionally changed. For example, when the number of revolutions per minute of the light deflector 202 is increased in order to decrease the magnifying power in the sub-scanning direction, the scanning speed of the write light increases. Accordingly, the magnifying power in the main scanning direction increases. For example, when the number of revolutions per minute of the light deflector 202 is decreased in order to increase the magnifying power in the sub-scanning direction, the scanning speed of the write light decreases. Accordingly, the magnifying power in the main scanning direction decreases.

In the concrete examples as illustrated in the sub-diagrams (a) to (c) of FIG. 5, when the number of revolutions per minute (rpm) of the light deflector 202 is increased in order to cancel the elongation of the image in the sub-scanning direction, the scanning speed of the write light is increased. Accordingly, the interval of one dot of the electrostatic latent image that is written for each clock pulse of the write light is increased. Accordingly, the magnifying power in the main scanning direction increases, and the image tends to extend in the main scanning direction. As illustrated in the sub-diagram (c) of FIG. 5, an inequality holds true as given below.

$$A2 > A1$$

As described above, when the magnifying power in the sub-scanning direction is adjusted by adjusting the number of revolutions per minute of the light deflector 202, the magnifying power in the main scanning direction changes in conjunction with the adjustment of the magnifying power in the sub-scanning direction. Accordingly, it is necessary to cancel the change in the magnifying power in the main scanning direction. Accordingly, when adjusting the magnifying power in the sub-scanning direction by adjusting the number of revolutions per minute of the light deflector 202, the writing controller 350' adjusts the magnifying power in the main scanning direction by adjusting the write clock frequency to cancel the change in the magnifying power in the main scanning direction.

Figure 6A:
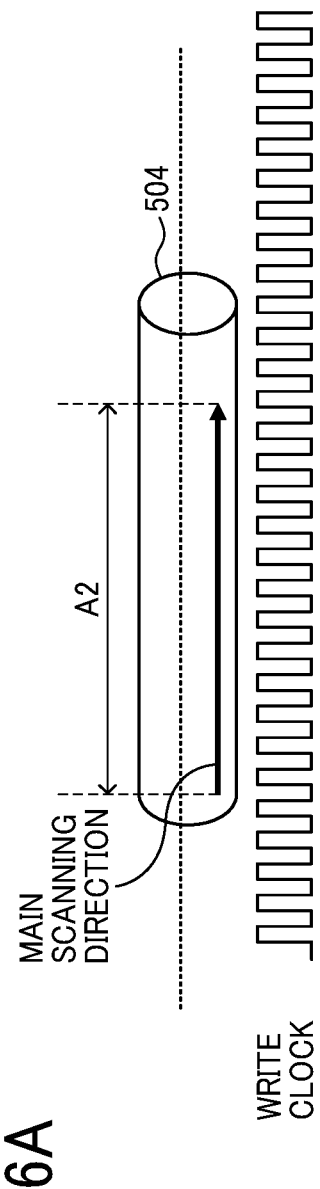
FIG. 6A is a diagram illustrating the relation between a write clock and the position on a photoconductor drum when an image is enlarged in the main scanning direction, according to an embodiment of the present disclosure.
Figure 6B:
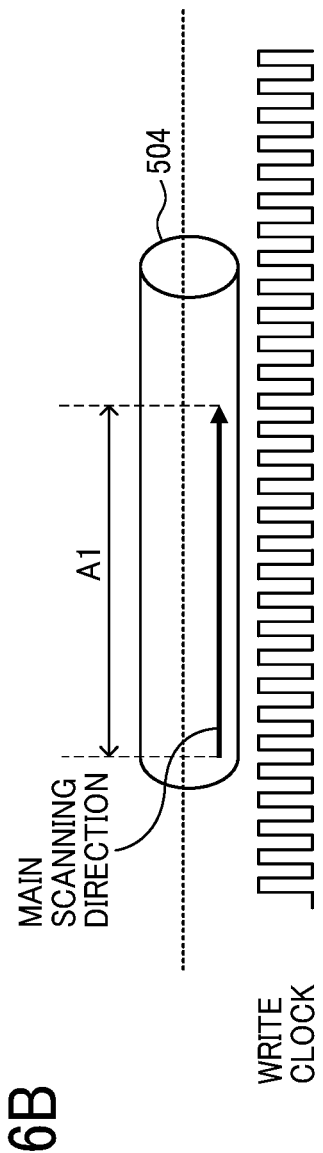
FIG. 6B is a diagram illustrating the relation between a write clock and the position on a photoconductor drum when the magnifying power in the main scanning direction is adjusted for the image referred to in FIG. 6A.

FIG. 6A and FIG. 6B are diagrams each illustrating a case where the write clock frequency is adjusted in order to adjust the magnifying power in the main scanning direction, according to an embodiment of the present disclosure.

For example, as in the concrete examples described above with reference to the sub-diagrams (a) to (c) of FIG. 5, when the number of revolutions per minute (rpm) of the light deflector 202 is increased in order to cancel the elongation of the image in the sub-scanning direction, the interval of one dot of the electrostatic latent image that is written for each clock pulse of the write light is increased. For this reason, as illustrated in FIG. 6A, the length of the image in the main scanning direction becomes A2 whose length is longer than A1 that indicates the original size, and the magnifying power in the main scanning direction tends to increase.

In order to cancel the changes in the magnifying power in the main scanning direction, the write clock frequency of the write light may be increased. According to such a configuration, even if the scanning speed of the write light increases due to an increase in the number of revolutions per minute of the light deflector 202, the write clock frequency of the write light increases, and as a result, as illustrated in FIG. 6B, the interval of one dot of the electrostatic latent image written for each clock pulse of the write light is narrowed. As a result, the length of the image in the main scanning direction returns to A1 that indicates the original size of the image, and the changes in the magnifying power in the main scanning direction is cancelled.

FIG. 7 is a schematic flowchart of the controlling processes performed by a writing controller 350' according to a control sample of the above embodiment of the present disclosure.

If the number of revolutions per minute of the light deflector 202, which indicates the speed of operation, is changed while an electrostatic latent image is being written, the magnifying power in the sub-scanning direction and the magnifying power in the main scanning direction tend to change in one image, and the image tends to be distorted. Such a period during which an electrostatic latent image is being written may be referred to as a latent-image writing period in the following description. For this reason, typically, the number of revolutions per minute (rpm) of the light deflector 202 is changed to adjust the magnifying power in the sub-scanning direction, during a period in which no latent image is written. Such a period in which no latent image is written corresponds to the space between two pages. More specifically, in a step S1, the controller 352' of the writing controller 350' monitors the sheet gating signals. When a sheet gating signal is negated ("YES" in the step S1), in a step S2, the controller 352' of the writing controller 350' changes the number of revolutions per minute (rpm) of the light deflector 202 in order to adjust the magnifying power in the sub-scanning direction. In so doing, based on the received information about magnifying power in the sub-scanning direction, the controller 352' controls the motor 202c of the light deflector 202 such that the number of revolutions per minute of the light deflector 202 becomes the number of revolutions per minute that corresponds to the magnifying power in the sub-scanning direction indicated by the information about magnifying power in the sub-scanning direction.

In a step S3, the controller 352' adjusts the magnifying power in the main scanning direction in order to cancel the changes in the magnifying power in the main scanning direction that are caused as the number of revolutions per minute of the light deflector 202 is changed. In so doing, the controller 352' controls the light source 102 based on the changed number of revolutions per minute of the light deflector 202 such that the write clock frequency becomes a frequency corresponding to the changed number of revolutions per minute.

As described above, in the writing controller 350' according to the control sample, the control for adjusting the magnifying power for an image in the sub-scanning direction of an image, which includes the control of the number of revolutions per minute of the light deflector 202 in the step S2 and the control of the write clock frequency of the write light in the step S3, is performed by the controller 352' that is a single unit. Accordingly, the processing load on the controller 352' is heavy. Moreover, when the magnification correction table is referred to at the time of controlling the write clock frequency, the reference time is also required. For this reason, it takes a considerable length of time for the controller 352' to complete the control of the write clock frequency, and the control of the number of revolutions per minute of the light deflector 202 in the step S2 and the control of the write clock frequency of the write light in the step S3 cannot quickly be performed in order to adjust the magnifying power in the sub-scanning direction. In particular, when a high-speed machine with high productivity is adopted, the length of time that corresponds to the space between two pages is short. Accordingly, there may be some cases in which the control of the number of revolutions per minute of the light deflector 202 in the step S2 and the control of the write clock frequency of the write light in the step S3 cannot be completed within the length of time corresponding to the space between two pages.

Figure 8:
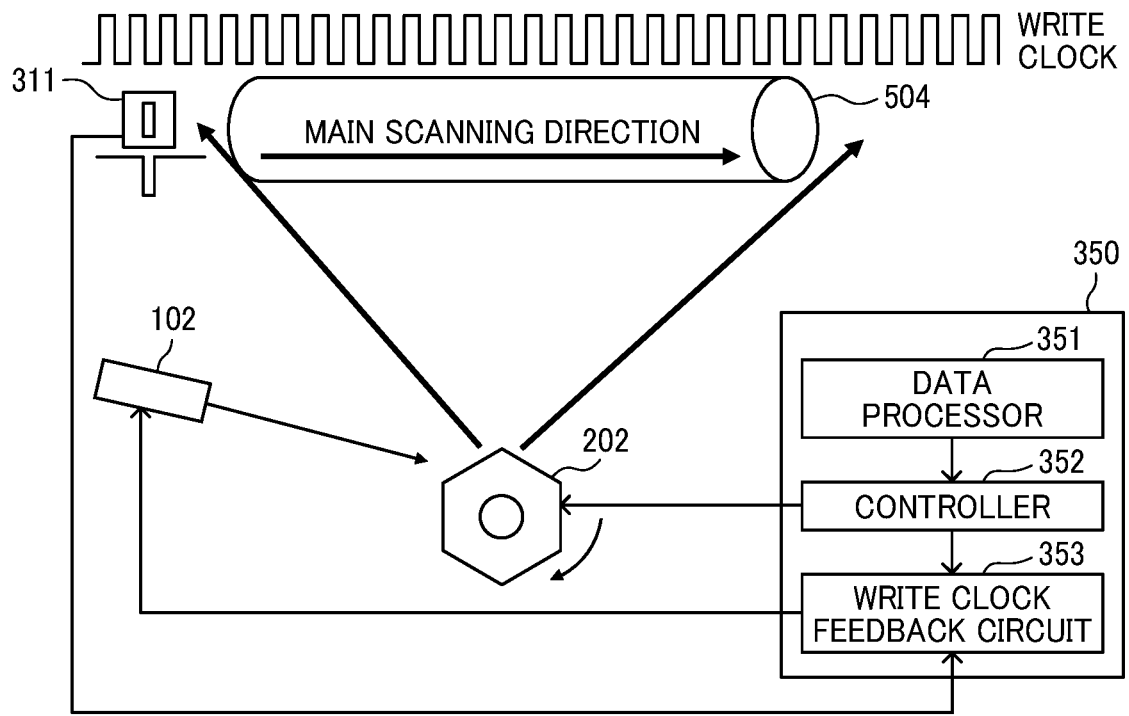
FIG. 8 is a diagram illustrating an optical writing device according to an embodiment of the present disclosure.

FIG. 8 is a diagram illustrating a configuration or structure of the optical writing device 100 according to the present embodiment.

Figure 9:
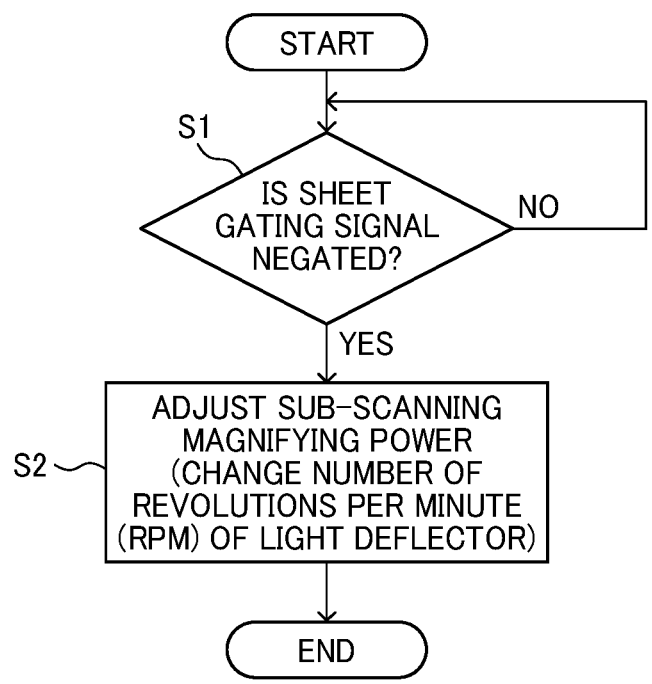
FIG. 9 is a schematic flowchart of the controlling processes performed by a writing controller according to an embodiment of the present disclosure.

FIG. 9 is a schematic flowchart of the controlling processes performed by the writing controller 350, according to the present embodiment.

The writing controller 350 according to the present embodiment uses the write clock feedback circuit (write CLKFB circuit) 353 to perform the adjustment of the magnifying power in the main scanning direction, which is the control of the write clock frequency of the write light, performed by the controller 352' in the writing controller 350' according to a control sample of the above embodiment of the present disclosure. In other words, the writing controller 350 according to the present embodiment includes a write clock feedback circuit 353 that serves as a write clock frequency controller and controls the write clock frequency, in addition to the controller 352 that serves as a light-deflector controller and controls the number of revolutions per minute (speed of operation) of the light deflector 202 in order to adjust the magnifying power in the sub-scanning direction.

Due to such a configuration, as illustrated in FIG. 9, the processing step in the steps S3 of the control flow illustrated in FIG. 7 does not have to be executed in the control flow performed by the controller 352 for controlling the number of rotations of the light deflector 202. Accordingly, the processing load on the controller 352 can be lightened. Moreover, the control by the controller 352, which may be referred to as software control in the following description, and the control by the write clock feedback circuit 353, which may be referred to as hardware control in the following description, can be executed in parallel. As a result, the adjustment of the magnifying power in the sub-scanning direction as well as the adjustment of the magnifying power in the main scanning direction accompanying the adjustment of the magnifying power in the sub-scanning direction can be performed at high speed compared with the above-described control sample of the above embodiments of the present disclosure.

The write clock feedback circuit 353 according to the present embodiment controls the write clock frequency over a period where the write light scans an area within a prescribed distance in the main scanning direction such that the number of clock pulses of the write light will become a target number of pulses. Such a period where the write light scans an area within a prescribed distance in the main scanning direction may be referred to as a prescribed distance scanning period in the following description. When the number of revolutions per minute of the light deflector 202 is changed by the controller 352, if the write clock frequency remains constant, the interval of one dot of the electrostatic latent image written for each clock pulse of the write light changes as described above. In other words, the number of clock pulses of the write light changes over a period where the write light scans an area within a prescribed distance in the main scanning direction. Such a prescribed distance in the main scanning direction is equivalent to, for example, the length of the photoconductor drum from one end to the other end in the axial direction.

For example, the above-described prescribed distance scanning period can be determined based on the period between the instant when the leading-end synchronization sensor 311 that serves as a light receiver receives the write light and the instant when the leading-end synchronization sensor 311 receives the write light next time or after the next time. In such cases, the prescribed distance scanning period can be grasped by the leading-end synchronizing signal of the leading-end synchronization sensor 311. If the write clock frequency is controlled such that the number of clock pulses of the write light in the prescribed distance scanning period will not change, the changes in the magnifying power in the main scanning direction due to the changes in the number of rotations of the light deflector 202 can be cancelled.

Figure 10:
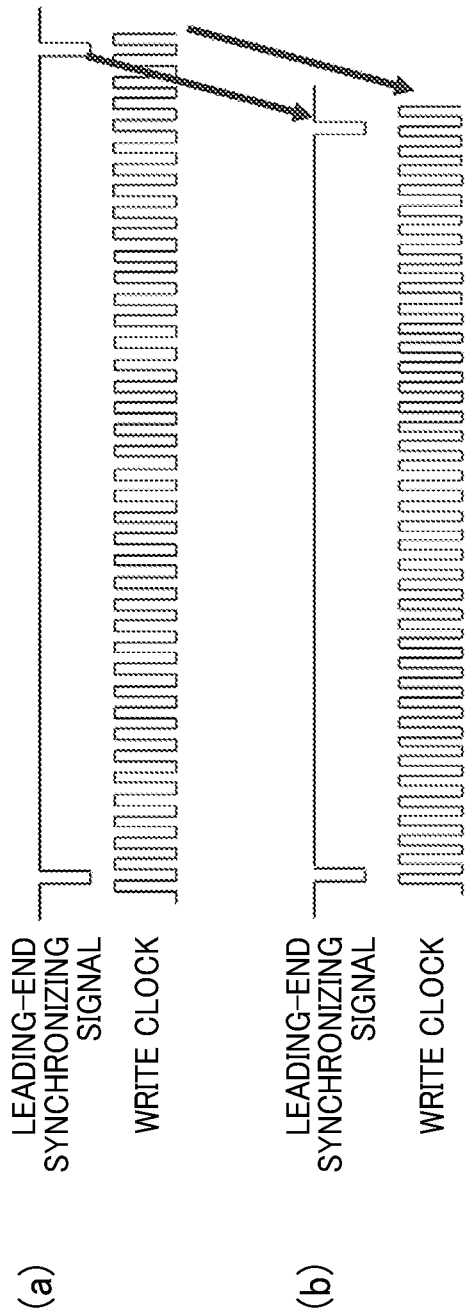
FIG. 10 includes a sub-diagram (a) of FIG. 10 and a sub-diagram (b) of FIG. 10, where the sub-diagram (a) of FIG. 10 illustrates the relation between a leading-end synchronizing signal and a write clock when an image is enlarged in the main scanning direction, according to an embodiment of the present disclosure, and the sub-diagram (b) of FIG. 10 illustrates the relation between a leading-end synchronizing signal and a write clock when the magnifying power in the main scanning direction is adjusted on the image referred to in the sub-diagram (a) of FIG. 10.

FIG. 10 includes sub-diagrams (a) and (b). The sub-diagram (a) of FIG. 10 illustrates the relation between a leading-end synchronizing signal and a write clock when an image is enlarged in the main scanning direction, according to the present embodiment, and the sub-diagram (b) of FIG. 10 illustrates the relation between a leading-end synchronizing signal and a write clock when the magnifying power in the main scanning direction is adjusted on the image referred to in the sub-diagram (a) of FIG. 10.

For example, as in the concrete examples described above with reference to the sub-diagrams (a) to (c) of FIG. 5, it is assumed that the number of revolutions per minute (rpm) of the light deflector 202 is increased in order to cancel the elongation of the image in the sub-scanning direction by the controller 352. In such cases, as described above, the interval of one dot of the electrostatic latent image written for each clock pulse of the write light is widened. Accordingly, when the write clock frequency is constant, the magnifying power in the main scanning direction is increased. As a result, the number of revolutions per minute of the light deflector 202 is increased, and the timing at which a leading-end synchronizing signal is detected changes from the timing as illustrated in the sub-diagram (a) of FIG. 10 to the timing as illustrated in the sub-diagram (b) of FIG. 10. Moreover, the cycle in which the leading-end synchronizing signal is detected is shortened. Such a cycle in which the leading-end synchronizing signal is detected may be referred to as a detection time interval in the following description.

The write clock feedback circuit 353 according to the present embodiment feedback-controls the write clock frequency such that the number of clock pulses within a prescribed distance scanning period between the instant when the leading-end synchronization sensor 311 receives the write light and the instant when the leading-end synchronization sensor 311 subsequently receives the write light becomes the target number of pulses (fixed value). Accordingly, even if the number of revolutions per minute of the light deflector 202 is increased by the controller 352 and the cycle of the leading-end synchronizing signals, which corresponds to the prescribed distance scanning period, is shortened, the write clock frequency is increased by the write clock feedback circuit 353 as illustrated in the sub-diagram (a) of FIG. 10 and the sub-diagram (b) of FIG. 10. As a result, the number of clock pulses within the prescribed distance scanning period, which corresponds to the cycle in which the leading-end synchronizing signals are detected, is maintained at the target number of pulses (fixed value), and the interval of one dot of the electrostatic latent image that is written for each clock pulse of the write light is narrowed, and the changes in the magnifying power in the main scanning direction is cancelled.

In the present embodiment, the write clock feedback circuit 353 does not need a control operation such as an operation to change the target number of pulses when the write clock frequency is controlled such that the number of clock pulses of the write light in the prescribed distance scanning period will not change. In other words, when the controller 352 controls the number of revolutions per minute of the light deflector 202 in order to adjust the magnifying power in the sub-scanning direction, the write clock feedback circuit 353 may continue the same control as previous. Accordingly, when the magnifying power in the sub-scanning direction is to be adjusted, the operation of changing what is controlled by the write clock feedback circuit 353 such as the operation of making the controller 352 operate in synchronization with the write clock feedback circuit 353 is no longer needed, and the control of the write clock frequency by the write clock feedback circuit 353 is performed at high speed.

Moreover, the control of the write clock frequency in the present embodiment may be implemented by performing feedback control based on the counted value of the number of clock pulses of the write light in the prescribed distance scanning period or the detection data corresponding to such a counted value. The above detection data may be, for example, the information about the number of revolutions per minute of the light deflector 202. The above detection data may be, for example, the information about the number of revolutions per minute of the light deflector 202. Such feedback control can be implemented at low cost and at high speed by hardware control using an existing feedback circuit. Also in the present embodiment, control of the write clock frequency is implemented by hardware control by the write clock feedback circuit 353.

For example, the write clock feedback circuit 353 according to the present embodiment can be implemented by a configuration or structure as follows. The write clock feedback circuit 353 receives the leading-end synchronizing signal as an electrical signal relating to a prescribed distance scanning period, and outputs a writing clock signal to the light source 102 as an electrical signal relating to a write clock frequency at which the number of clock pulses in the above period is set to a target number of pulses. The write clock feedback circuit 353 is provided with a counter that counts the number of clock pulses generated during a prescribed distance scanning period between the instant when the leading-end synchronizing signal is input and the instant when the next leading-end synchronizing signal is input. Then, the write clock feedback circuit 353 feedback-controls the write clock frequency to be output to the light source 102 such that the number of clock pulses counted by the counter becomes the target number of pulses (fixed value).

In the present embodiment, it is assumed that the prescribed distance scanning period is a period between the instant when the leading-end synchronization sensor 311 receives the write light and the instant when the leading-end synchronization sensor 311 receives the write light next time, which may be referred to as one cycle of the leading-end synchronizing signal in the following description. However, no limitation is indicated thereby, and the prescribed distance scanning period may be set to a period equal to or longer than two cycles of the leading-end synchronizing signal.

Figure 11:
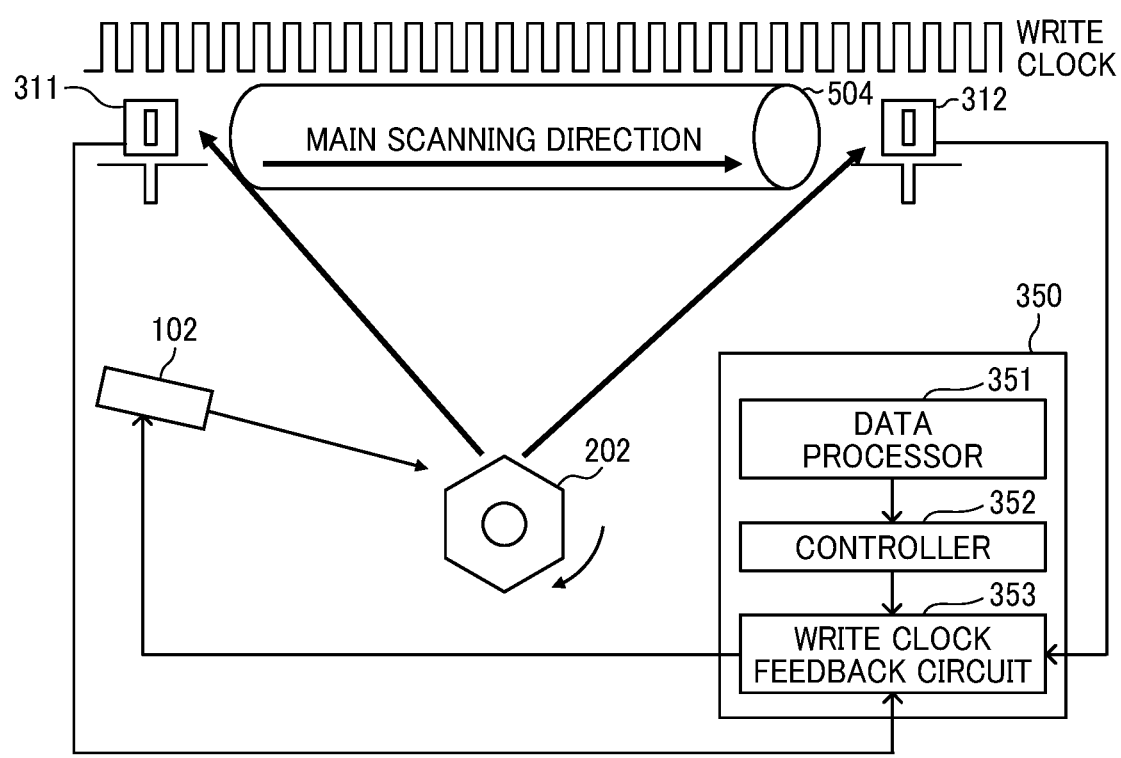
FIG. 11 is a diagram illustrating an optical writing device according to an alternative embodiment of the present disclosure.

FIG. 11 is a diagram illustrating the optical writing device according to an alternative embodiment of the present disclosure.

As illustrated in FIG. 11, a trailing-end synchronization sensor 312 may be arranged in addition to the leading-end synchronization sensor 311. For example, in order to prevent the influence of thermal expansion of the scanning lens 301, the leading-end synchronization sensor 311 and the trailing-end synchronization sensor 312 may be provided. In such a case, the prescribed distance scanning period may be a period between the instant when the leading-end synchronization sensor 311 receives the write light and the instant when the trailing-end synchronization sensor 312 receives the write light.

In this configuration, the trailing-end synchronizing signal of the trailing-end synchronization sensor 312 is also input to the write clock feedback circuit 353 of the writing controller 350. Then, the write clock feedback circuit 353 feedback-controls the write clock frequency such that the number of clock pulses within a period between the instant when the leading-end synchronization sensor 311 receives the write light to the instant when the trailing-end synchronization sensor 312 receives the write light becomes the target number of pulses.

FIG. 12 includes a sub-diagram (a) of FIG. 12 and a sub-diagram (b) of FIG. 12. The sub-diagram (a) of FIG. 12 illustrates the relation between a leading-end synchronizing signal, a trailing-end synchronizing signal, and a write clock when an image is enlarged in the main scanning direction, according to the alternative embodiment of FIG. 11, and the sub-diagram (b) of FIG. 12 illustrates the relation between a leading-end synchronizing signal, a trailing-end synchronizing signal, and a write clock when the magnifying power in the main scanning direction is adjusted on the image referred to in the sub-diagram (a) of FIG. 12.

For example, as in the concrete examples described above with reference to the sub-diagrams (a) to (c) of FIG. 5, it is assumed that the number of revolutions per minute (rpm) of the light deflector 202 is increased in order to cancel the elongation of the image in the sub-scanning direction by the controller 352. In such cases, as described above, the interval of one dot of the electrostatic latent image written for each clock pulse of the write light is widened. Accordingly, when the write clock frequency is constant, the magnifying power in the main scanning direction is increased. As a result, the number of revolutions per minute of the light deflector 202 is increased, and in comparison to the timing at which a leading-end synchronizing signal is detected, the timing at which a trailing-end synchronizing signal is detected changes from the timing illustrated in FIG. 12A to the timing illustrated in FIG. 12B. In other words, the period between the instant when the leading-end synchronization sensor 311 receives the write light and the instant when the trailing-end synchronization sensor 312 receives the write light is shortened.

The write clock feedback circuit 353 according to the present embodiment feedback-controls the write clock frequency such that the number of clock pulses within a prescribed distance scanning period between the instant when the leading-end synchronization sensor 311 receives the write light and the instant when the trailing-end synchronization sensor 312 receives the write light will become the target number of pulses (fixed value). Accordingly, even if the number of revolutions per minute of the light deflector 202 is increased by the controller 352 and the prescribed distance scanning period is shortened, the write clock frequency is increased by the write clock feedback circuit 353 as illustrated in the sub-diagram (a) of FIG. 10 and the sub-diagram (b) of FIG. 10. As a result, the number of clock pulses within the prescribed distance scanning period is maintained at the target number of pulses (fixed value), and the interval of one dot of the electrostatic latent image that is written for each clock pulse of the write light is narrowed, and the changes in the magnifying power in the main scanning direction is cancelled.

In the present embodiment, as illustrated in FIG. 9, the sheet gating signals are monitored in the step S1, and when a sheet gating signal is negated ("YES" in the step S1), in the step S2, the number of revolutions per minute (rpm) of the light deflector 202 is changed by the controller 352 in order to adjust the magnifying power in the sub-scanning direction. Accordingly, during the latent-image writing period in which the electrostatic latent image is written on the photoconductor drum by the write light, the number of revolutions per minute (rpm) of the light deflector 202 is not changed, and the rotation speed of the light deflector 202 is maintained at a constant degree. Accordingly, the image distortion due to the changes in the magnifying power in the sub-scanning direction and the changes in the magnifying power in the main scanning direction on one image can be prevented.

In the present embodiment, the write clock feedback circuit 353 does not change the write clock frequency during the latent-image writing period, and the write clock frequency is maintained at a constant degree. Noise such as disturbance light may be input to the leading-end synchronization sensor 311 or the trailing-end synchronization sensor 312. When such noise input occurs during the latent-image writing period, there may be some cases in which the prescribed distance scanning period is erroneously recognized and the magnifying power in the main scanning direction of the latent image may be erroneously changed. In such cases, an abnormal image may be generated. With the configuration in which the write clock frequency is not changed during the latent-image writing period as in the present embodiment, even if noise input occurs during the latent-image writing period, the write clock frequency is not changed, and the occurrence of an abnormal image is prevented.

The embodiments described above are given as an example, and unique advantageous effects are achieved for each of the following modes given below.

First Mode

According to the first mode of the present disclosure, the light source 102 configured to emit light at a prescribed write clock frequency, the light emitted from the light source indicating image data, the light deflector 202 configured to deflect write light including repetition pulsed light corresponding to the image data to scan a moving surface of a photoconductor such as each one of the photoconductor drums 501, 502, 503, and 504 repeatedly in a main scanning direction, and to write a latent image on the surface of the photoconductor based on the image data; the optical writing device 100 includes a light-deflector controller such as the controller 352 configured to control the speed of operation of the light deflector based on image magnifying-power information in a sub-scanning direction parallel to a direction in which the surface of the photoconductor moves, and a write clock frequency controller such as the write clock feedback circuit 353 configured to control the prescribed write clock frequency such that the number of clock pulses of the write light will become a target number of pulses over a period where the write light scans an area within a prescribed distance in the main scanning direction. The write clock frequency controller is configured to maintain the target number of pulses even when the speed of operation of the light deflector is changed by the light-deflector controller.

In such known optical writing devices that control the speed of operation of the light deflector to adjust the magnifying power for an image in the sub-scanning direction, the changes in the magnifying power for the image in the main scanning direction that are caused by the above may be are cancelled by the control performed on the write clock frequency. However, in the known optical writing devices, the speed of operation of the light deflector and the write clock frequency are controlled by a writing-operation controller that is a single unit. Accordingly, the processing load on such a single-unit controller is high. Moreover, it takes a long time to refer to the magnification correction table at the time of controlling the write clock frequency. For this reason, it takes a considerable length of time to complete the control of the write clock frequency. Accordingly, the magnifying power for the image in the sub-scanning direction cannot be adjusted at high speed, and the changes in the magnifying power for the image in the main scanning direction that are caused in response to the adjustment of the magnifying power for the image in the sub-scanning direction cannot be cancelled at high speed.

The optical writing device 100 according to the present mode includes a write clock frequency controller configured to control the prescribed write clock frequency, in addition to a light-deflector controller configured to control speed of operation of the light deflector based on image magnifying-power information in a sub-scanning direction parallel to a direction in which a surface of the photoconductor moves. As described above, in the present mode, the speed of operation of the light deflector and the write clock frequency are controlled by separate controllers, respectively. As a result, the processing load on each controller can be reduced, and the multiple control processes can be performed in parallel. Accordingly, the magnifying power for the image can be adjusted at high speed.

The write clock frequency controller according to the present mode is configured to control the prescribed write clock frequency such that a number of clock pulses of the write light will become a target number of pulses over a period where the write light scans an area within a prescribed distance in the main scanning direction. When the speed of operation of the light deflector is changed by the light-deflector controller and the write clock frequency remains at a constant degree, the number of clock pulses of the write light changes over a period where the write light scans an area within a prescribed distance in the main scanning direction, and the magnifying power for the image in the main scanning direction changes. In such cases, if the write clock frequency is controlled such that the number of clock pulses of the write light in the above period will not change, the changes in the magnifying power for the image in the main scanning direction due to the changes in the speed of operation of the light deflector can be cancelled. Due to such a configuration according to the present mode of the present disclosure, even if the speed of operation of the light deflector is changed in order to adjust the magnifying power for the image in the sub-scanning direction, the changes in the magnifying power for the image in the main scanning direction due to the control of the write clock frequency performed by the write clock frequency controller can be cancelled.

Moreover, the write clock frequency controller according to the present mode does not need to change a control operation such as an operation to change the target number of pulses when the write clock frequency is controlled such that the number of clock pulses of the write light in the prescribed distance scanning period will not change. In other words, when the light-deflector controller changes the speed of operation of the light deflector in order to adjust the magnifying power for the image in the sub-scanning direction, the write clock frequency controller may continue the same control as previous. Accordingly, when the magnifying power for the image in the sub-scanning direction is to be adjusted, the operation of changing what is controlled by the write clock frequency controller such as the operation of making the light-deflector controller operate in synchronization with the write clock frequency controller is no longer needed, and the write clock frequency by the write clock frequency controller can be controlled at high speed.

Further, the control of the write clock frequency controller according to the present mode can be implemented by, for example, performing feedback control of the write clock frequency based on a count value of the number of clock pulses of the write light in the period or detection information corresponding to the count value. Such feedback control can be implemented at high speed using an existing feedback circuit. Accordingly, the control operation of the write clock frequency controller can be performed at even higher speed.

Second Mode

According to the second mode of the present disclosure, in the optical writing device 100 according to the first mode of the present disclosure, the write clock frequency controller is configured by a feedback control circuit such as the write clock feedback circuit 353 to which an electrical signal such as a leading-end synchronizing signal and a trailing-end synchronizing signal relating to the write clock frequency is input, and the feedback control circuit is configured to output an electrical signal such as a write clock pulse signal relating to the prescribed write clock frequency at which the number of clock pulses of the write light in the period is set to the target number of pulses.

According to the present mode, the control on the write clock frequency can be performed at high speed by performing control on the hardware using a feedback control circuit.

Third Mode

According to the third mode of the present disclosure, in the optical writing device 100 according to the first mode or the second mode of the present disclosure, the write clock frequency controller comprises a counter configured to count the number of the clock pulses of the write light during the period, to control the prescribed write clock frequency, and the number of the clock pulses counted by the counter becomes equivalent to the target number of pulses as the prescribed write clock frequency is controlled by the write clock frequency controller.

According to the present mode, the control on the write clock frequency can be performed at high speed.

Fourth Mode

According to the fourth mode of the present disclosure, the optical writing device 100 according to any one of the first mode to the third mode of the present disclosure further includes a light receiver such as the leading-end synchronization sensor 311 disposed in an optical scanning range of the write light deflected by the light deflector, and the period is a period between an instant when the light receiver receives the write light and an instant when the light receiver receives the write light next time or after the next time.

According to the present mode, the write clock frequency can be controlled using a signal such as a leading-end synchronizing signal output from the light receiver such as an existing leading-end synchronization sensor 311.

Fifth Mode

According to the fifth mode of the present disclosure, the optical writing device 100 according to any one of the first mode to the third mode of the present disclosure further includes a pair of light receivers such as the leading-end synchronization sensor 311 and the trailing-end synchronization sensor 312 disposed in an optical scanning range of the write light deflected by the light deflector, and the period is a period between an instant when one of the pair of light receivers such as the leading-end synchronization sensor 311 receives the write light and an instant when another one of the pair of light receivers such as the trailing-end synchronization sensor 312 receives the write light.

According to the present mode, the write clock frequency can be controlled using a signal such as a leading-end synchronizing signal and a trailing-end synchronizing signal output from the light receiver such as an existing leading-end synchronization sensor 311 and an existing trailing-end synchronization sensor 312.

Sixth Mode

According to the sixth mode of the present disclosure, in the optical writing device 100 according to any one of the first mode to the fifth mode of the present disclosure, when the speed of operation of the light deflector is controlled based on the image magnifying-power information in the sub-scanning direction, the light-deflector controller maintains the speed of operation of the light deflector at a constant degree during a latent-image writing period, and changes the speed of operation of the light deflector during a period in which no latent image is written.

According to the present mode, the image distortion due to the changes in the magnifying power in the sub-scanning direction and the changes in the magnifying power in the main scanning direction on one image can be prevented.

Seventh Mode

According to the seventh mode of the present disclosure, in the optical writing device 100 according to any one of the first mode to the sixth mode of the present disclosure, when the prescribed write clock frequency is controlled, the write clock frequency controller maintains the prescribed write clock frequency at a constant degree during a latent-image writing period, and changes the prescribed write clock frequency during a period in which no latent image is written.

According to the present mode, even if noise input occurs during the latent-image writing period, the write clock frequency is not changed, and the occurrence of an abnormal image is prevented.

Eighth Mode

According to the eighth mode of the present disclosure, an image forming apparatus is provided with an optical writing device configured to write a latent image on the surface of a photoconductor based on image data, and the optical writing device 100 according to any one of the first mode to the seventh mode of the present disclosure is used as the optical writing device.

According to the present mode, the speed of operation of the light deflector is changed to adjust the magnifying power for an image in the sub-scanning direction, and the control operation of cancelling the changes in the magnifying power for the image in the main scanning direction that are caused by the above adjustment can be performed at high speed. As a result, an image forming apparatus that can adjust the magnifying power for an image at high speed can be provided.

Ninth Mode

According to the ninth mode of the present disclosure, an optical writing device is controlled in a method, and the optical writing device includes a light source configured to emit light at a prescribed write clock frequency, the light emitted from the light source indicating image data, a light deflector configured to deflect write light including repetition pulsed light corresponding to the image data to scan a moving surface of a photoconductor repeatedly in a main scanning direction, and to write a latent image on the surface of the photoconductor based on the image data. The method includes a step of controlling the speed of operation of a light deflector based on image magnifying-power information in a sub-scanning direction parallel to a direction in which a surface of a photoconductor moves, and a step of controlling the prescribed write clock frequency such that the number of clock pulses of the write light will become a target number of pulses over a period where the write light scans an area within a prescribed distance in the main scanning direction. In the step of controlling the prescribed write clock frequency, the target number of pulses being maintained even when the speed of operation of the light deflector is changed in the controlling the speed of operation of the light deflector.

According to the present mode, the speed of operation of the light deflector is changed to adjust the magnifying power for an image in the sub-scanning direction, and the control operation of cancelling the changes in the magnifying power for the image in the main scanning direction that are caused by the above adjustment can be performed at high speed. As a result, the magnifying power for an image can be adjusted at high speed.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An optical writing device comprising:
a light source configured to emit light at a prescribed write clock frequency, the light emitted from the light source indicating image data;
a light deflector configured to deflect write light including repetition pulsed light corresponding to the image data to scan a moving surface of a photoconductor repeatedly in a main scanning direction, and to write a latent image on the surface of the photoconductor based on the image data;
a light-deflector controller configured to control speed of operation of the light deflector based on image magnifying-power information in a sub-scanning direction parallel to a direction in which the surface of the photoconductor moves; and
a write clock frequency controller configured to control the prescribed write clock frequency such that a number of clock pulses of the write light will become a target number of pulses over a period where the write light scans an area within a prescribed distance in the main scanning direction, the write clock frequency controller being configured to maintain the target number of pulses even when the speed of operation of the light deflector is changed by the light-deflector controller.

2. The optical writing device according to claim 1, wherein the write clock frequency controller is configured by a feedback control circuit to which an electrical signal relating to the period is input, and
wherein the feedback control circuit is configured to output an electrical signal relating to the prescribed write clock frequency at which the number of clock pulses of the write light in the period is set to the target number of pulses.

3. The optical writing device according to claim 1, wherein the write clock frequency controller comprises a counter configured to count a number of the clock pulses of the write light during the period, to control the prescribed write clock frequency, and
wherein the number of the clock pulses counted by the counter becomes equivalent to the target number of pulses as the prescribed write clock frequency is controlled by the write clock frequency controller.

4. The optical writing device according to claim 1, further comprising
a light receiver disposed in an optical scanning range of the write light deflected by the light deflector,
wherein the period is a period between an instant when the light receiver receives the write light and an instant when the light receiver receives the write light next time or after the next time.

5. The optical writing device according to claim 1, further comprising
a pair of light receivers disposed in an optical scanning range of the write light deflected by the light deflector,
wherein the period is a period between an instant when one of the pair of light receivers receives the write light and an instant when another one of the pair of light receivers receives the write light.

6. The optical writing device according to claim 1, wherein, when the speed of operation of the light deflector is controlled based on the image magnifying-power information in the sub-scanning direction, the light-deflector controller is configured to maintain the speed of operation of the light deflector at a constant degree during a latent-image writing period, and to change the speed of operation of the light deflector during a period in which no latent image is written.

7. The optical writing device according to claim 1, wherein, when the prescribed write clock frequency is controlled, the write clock frequency controller is configured to maintain the prescribed write clock frequency at a constant degree during a latent-image writing period, and to change the prescribed write clock frequency during a period in which no latent image is written.

8. An image forming apparatus comprising:
a photoconductor; and
the optical writing device according to claim 1 configured to write a latent image on a surface of the photoconductor based on image data.

9. A method of controlling an optical writing device, the method comprising:
controlling speed of operation of a light deflector based on image magnifying-power information in a sub-scanning direction parallel to a direction in which a surface of a photoconductor moves; and
controlling a prescribed write clock frequency such that a number of clock pulses of write light will become a target number of pulses over a period where the write light scans an area within a prescribed distance in a main scanning direction, the target number of pulses being maintained even when the speed of operation of the light deflector is changed in the controlling the speed of operation of the light deflector.

* * * * *